(12) United States Patent
Wang et al.

(10) Patent No.: US 7,674,717 B2
(45) Date of Patent: Mar. 9, 2010

(54) METHOD OF FABRICATING PERIODIC NANO-STRUCTURE ARRAYS WITH DIFFERENT FEATURE SIZES

(75) Inventors: Benzhong Wang, Singapore (SG); Soo Jin Chua, Singapore (SG)

(73) Assignee: Agency for Science, Technology and Research, Centros (SG)

( * ) Notice: Subject to any disclaimer, the term of this patent is extended or adjusted under 35 U.S.C. 154(b) by 0 days.

(21) Appl. No.: 11/377,998

(22) Filed: Mar. 17, 2006

(65) Prior Publication Data
US 2006/0275929 A1  Dec. 7, 2006

Related U.S. Application Data

(60) Provisional application No. 60/663,084, filed on Mar. 17, 2005.

(51) Int. Cl.
*H01L 21/302* (2006.01)
*H01L 21/461* (2006.01)

(52) U.S. Cl. .................. 438/706; 438/707; 438/710; 438/712; 438/714

(58) Field of Classification Search .................. None
See application file for complete search history.

(56) References Cited

U.S. PATENT DOCUMENTS

| | | | |
|---|---|---|---|
| 4,407,695 A * | 10/1983 | Deckman et al. | 216/42 |
| 5,437,892 A | 8/1995 | Nagayama et al. | |
| 5,505,996 A | 4/1996 | Nagayama | |
| 5,747,180 A | 5/1998 | Miller et al. | |
| 6,048,762 A * | 4/2000 | Hsia et al. | 438/238 |
| 6,225,207 B1 * | 5/2001 | Parikh | 438/622 |
| 6,518,194 B2 | 2/2003 | Winningham et al. | |
| 6,579,463 B1 | 6/2003 | Winningham et al. | |
| 6,861,362 B2 * | 3/2005 | Ko et al. | 438/706 |
| 2002/0098707 A1 * | 7/2002 | Ning | 438/712 |

OTHER PUBLICATIONS

*Physical Chemistry*, PW Atkins (1990).
*The Properties of Engineering Materials*, Raymond A Higgins (1979).
Two dimensional nonclose-packed colloidal crystals formed by spincoating, *Applied Physics Letters* 89, 011908 Peng Jiang et al (2006).
Colloidal Lithographic Nanopatterning via Reactive Ion Etching, *JACS Articles*, Choi et al (May 14, 2004).

* cited by examiner

*Primary Examiner*—Duy-Vu N Deo
(74) *Attorney, Agent, or Firm*—Blakely, Sokoloff, Taylor & Zafman LLP

(57) ABSTRACT

A method of fabricating a two dimensional nano-structure array of features comprising the steps of providing a substrate (10); forming an intermediate layer on said substrate (20), said intermediate layer having at least two selectively located regions (21, 22) of different uniform thickness; placing at least one layer of elements (30) over said intermediate layer, said elements placed in a close-packed arrangement forming an array of voids (33) between said elements; etching the intermediate layer through said voids, and so forming the array of features (51, 52) in said intermediate layer corresponding to the voids.

12 Claims, 6 Drawing Sheets

A SEM image shown the patterns of the SiO$_2$ template on a GaAs surface fabricated through a monolayer PS sphere assembly [20° tilted view].

A SEM image shown the patterns of the SiO2 template on GaAs surface fabricated through a bilayer PS sphere assembly [20° tilted view].

A SEM image shown the two sized InGaAs nano dots grown by MOCVD through the patterned SiO$_2$ template on GaAs surface [45° tilted view along the direction of long axle of the dots].

A SEM image shown the two sized InGaAs nano dots grown by MOCVD through the patterned SiO$_2$ template on GaAs surface [45° tilted view along the direction of the short axle of the dots].

METHOD OF FABRICATING PERIODIC NANO-STRUCTURE ARRAYS WITH DIFFERENT FEATURE SIZES

CROSS-REFERENCE TO RELATED APPLICATIONS

This application claims priority from U.S. Provisional Patent Application No. 60/663,084, filed on Mar. 17, 2005, which is incorporated herein by reference in its entirety.

FIELD OF THE INVENTION

The invention relates to the fabrication of nano-scale devices on a substrate. Specifically the invention relates to a method of fabricating arrays of different size features leading to the formation of devices of different sizes on the same substrate.

BACKGROUND

The fabrication of nano-scale optical devices requires the formation of arrays of individual features representing light sources or photo detectors within such devices. It follows that the density of such features will determine the sensitivity of the device and so requiring the mass scale fabrication of said features in order to improve performance.

However, to increase flexibility and broaden the application of use, such devices require the fabrication of different features within the same device. For instance, to create multi-wavelength light sources and wide spectral responsivity photodetectors. Customizing the fabrication process to include regions of features of varying size is a time consuming and relatively expensive process compared to the fabrication of a device having uniform features. Alternatively, substrates having uniform features but varying in size between said substrates may be combined to form an overall device. However, this may affect the density of the overall device and so lead to a loss of resolution.

It would therefore be useful to fabricate a device having features that vary in size and shape but at a lesser cost than the customized fabrication processes of the prior art.

SUMMARY OF THE INVENTION

It is therefore an object of the present invention to provide a method of fabricating an array of features on a substrate using a method that is less expensive than methods of the prior art whilst maintaining resolution of the device.

Therefore in a first aspect the invention provides a method of fabricating a two dimensional nano-structure array of features comprising the steps of providing a substrate; forming an intermediate layer on said substrate, said intermediate layer having at least two selectively located regions of different uniform thickness; placing at least one layer of elements over said intermediate layer, said elements placed in a close-packed arrangement forming an array of voids between said elements; etching the intermediate layer through said voids, and so forming the array of features in said intermediate layer corresponding to the voids.

Thus, the invention includes two critical steps. The formation of an intermediate layer having regions of different uniform thickness and subsequently placing at least one layer of elements forming a mask with periodic voids through which the array of features may be etched. The variation in thickness of the intermediate layer provides a selective placement of features which are uniform within the region of uniform thickness but vary from other regions having different thickness. The simplicity of the formation of these layers reduces the cost of the fabrication of the device by reducing the steps and maintaining the required steps as known fabricating processes.

In a preferred embodiment, the etching step may continue until the features extend from the upper surface of the intermediate layer to the substrate. It follows that regions of different thickness, assuming a uniform rate of etching across the element layer, will produce features of different sizes depending upon which region the features are located. That is to say, subject to the type of etching process involved, not only will the features vary in depth but may also vary in plan dimension such as width and breadth. For a circular shape, the feature may vary in diameter on the basis that the etching process also etches the feature laterally as it etches into the intermediate layer.

In a preferred embodiment, on completion of etching of the features, the elemental layer may be removed so as to complete the fabrication process. This may be performed by any number of known processes, for example, wet and dry etching.

The shape of the individual elements forming the elemental layer may vary subject to the requirement that the shapes form a close-packed arrangement. In a preferred embodiment, the elements may be spherical and may form a hexagonal close-packed arrangement. In this arrangement, the voids may be triangular in shape, from a plan view, and consequently the "windows" through which the etching process etches the intermediate layer may be triangular. In an alternative arrangement, the elements may be ovaloid.

In a preferred embodiment, the elements within the layer may be of uniform size and shape. Alternatively the elements may vary in size and/or shape subject to the condition that they must form a close-packed arrangement.

In a preferred embodiment, the intermediate layer may have only two regions of different thickness. Alternatively, the intermediate layer may have a plurality of regions having different thickness, which may correspond to selective placement of features of different size.

In a preferred embodiment a second layer of element may be placed. This second layer of elements may be arranged to maintain a close packed hexagonal arrangement creating a lower density of voids, said voids being hexagonal in shape.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 4b is a top view of a schematic drawing showing the structures after dry etching of the sample shown in FIG. 4a;

DESCRIPTION OF PREFERRED EMBODIMENT

The present invention seeks to provide a simple and fast method for fabricating multi-sized patterned arrays and nanometer scale structured arrays having different sizes deposited through the patterned arrays. These different sized arrays may be used in fabricating semiconductor light sources having different emitting wavelengths, or fabricating semiconductor photodetectors having different response wavelength, or fabricating 2D photonic crystal materials having different properties.

In the present invention, a method is provided for nanometer scaled pattern formation on a selected substrate. This process opens a route for nano-meter scale surface patterning by utilizing spontaneous self-assembly of latex spheres at length scales difficult to obtain by standard semiconductor lithography techniques. This method also provides an easy, inexpensive, and fast means for pattern transfer over large areas.

The method is based on the principle that elements, for instance spherical particles, serve as etching mask, which are also slowly etched away during dry etching resulting in the reduction of diameter of the elements. This effect results in etched walls of nano-windows of the intermediate layer being not vertical. Hence, the nano-windows formed on the intermediate layer will be enlarged at the regions where the layer is thinner compared to nano-windows on the thicker layer. The structures formed by this method can be used not only directly as functional materials, such as chemical sensors, photonic bandgap materials, but also serve as a mask to deposit selectively nanoparticles, for example, for growing InGaAs, GaAs, InGaAlP quantum dot arrays with different optoelectronic properties on a GaAs substrate by selective MOCVD through $SiO_2$ nano-patterned arrays.

Figure 1:
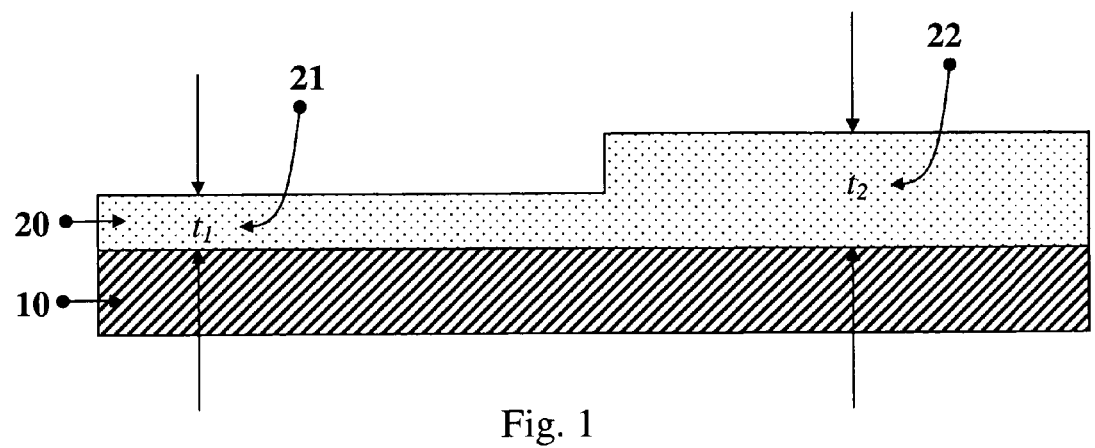
FIG. 1 is a cross-sectional schematic drawing showing an intermediate layer with two different thicknesses formed on a selected substrate, according to an embodiment of the present invention.
Figure 4A:
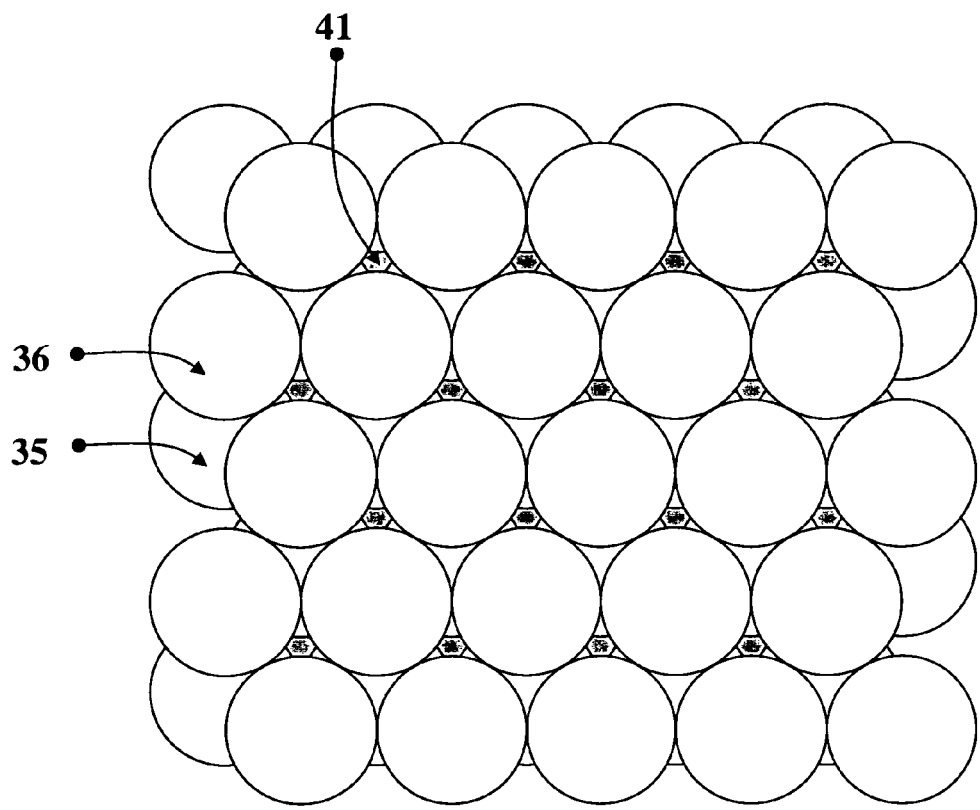
FIG. 4a is a top view of schematic drawing showing bilayered latex spheres forming a hexagonal-close-packed arranged on the surface of the intermediate layer.

Referring to FIG. 1, an intermediate layer 20 with regions of different thickness 21 and 22 is formed on a selected substrate 10. Then spherical particles 30 are placed on the surface of the intermediate layer 20 to form close-packed arrays by any suitable method in monolayer (as shown in FIG. 2) or bilayer (as shown in FIG. 4a). In this embodiment, said substrate material 10 is GaAs, but any other materials having a flat surface can be used such as Si, $SiO_2$, GaAs, InP, Glass, metals etc. or combination of them, can be used depending on its application.

In this embodiment, a 100 nm $SiO_2$ is first deposited on the GaAs substrate by PECVD to form said intermediate layer 20. Photolithography is used to form patterns and then the exposed areas are dry etched partially down to 50 nm to form the areas 21. The other areas where the thickness of 100 nm is not etched are areas 22. Normally, any other materials with a flat hydrophilic surface or having a flat hydrophilic surface formed after the etching process may be used as said intermediate layer 20, depending on its application. The flat surface allows hexagonal close packing of spheres to be formed on the surface by a suitable method said methods being clearly within the knowledge of the skilled person. The thickness of the thickest areas depends on the dry etching properties of the intermediate layer 20 and the spherical particles 30 used. Thicker layer 20 can be used if the dry etching rate for the spherical particles 30 is less than that for the intermediate layer 20. Otherwise, a thinner layer should be used.

Figure 2A:
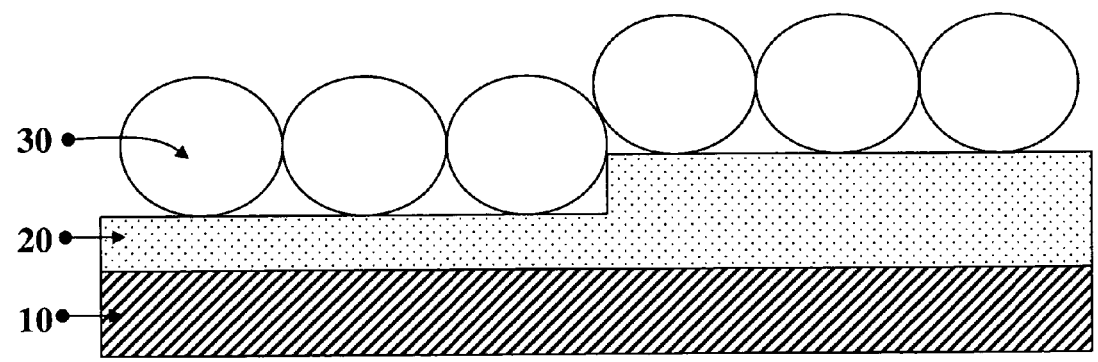
FIG. 2a is a cross-sectional schematic drawing showing a monolayered latex spheres forming a hexagonal-close-packed arrangement on the surface of the intermediate layer according to an embodiment of the present invention.
Figure 2B:
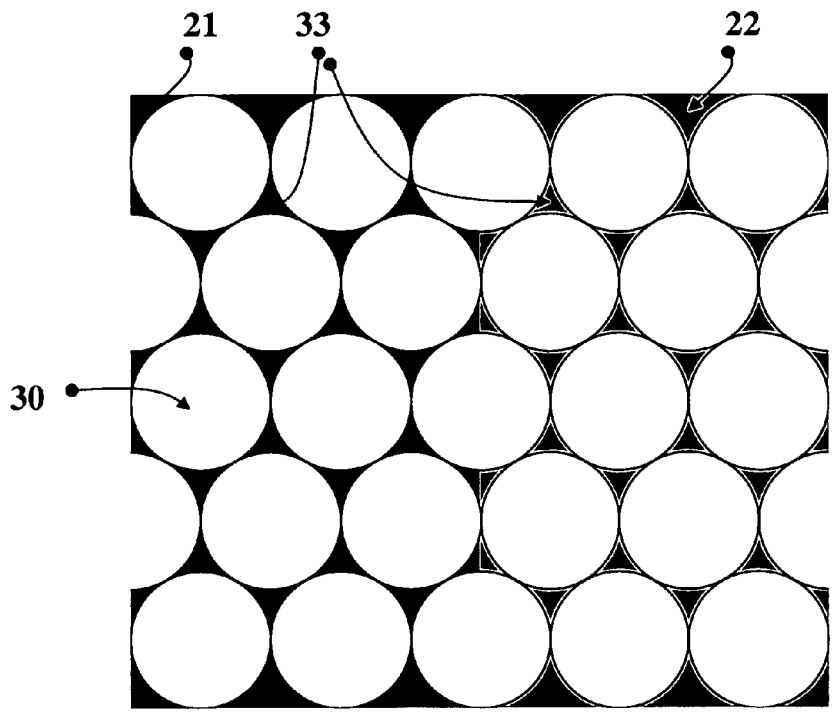
FIG. 2b is a plan view of a schematic drawing showing a monolayered latex spheres forming a hexagonal-close-packed arranged on the surface of the intermediate layer.

Said spherical particles preferred to be polystyrene (PS) polymer, but not limited to this material. Any other organic or inorganic spherical material may be suitable including $SiO_2$, if the particles have good adherence with said intermediate layer which means that the spherical particles assemble in a regular and stable manner. In addition, the choice of the sphere material and the intermediate layer also depends on the applications of the nano-structures fabricated through this method, e.g. there is at least one means available to remove the spherical material left on the intermediate layer surface after the dry etching process if the removing process is necessary for application of the nano-structures. The diameter of the particles may be in the range of 20 nm to 2000 nm, which are commercially available. In this preferred embodiment, the average diameter of the PS spherical particles is 300 nm with deviation of 5% available commercially. The solution containing 5 wt % PS spherical particles is diluted with DI water in the ratio of 1:5. Then the diluted solution containing the PS particles is spin-coated onto the said $SiO_2$ intermediate layer (referred as 20) containing the areas 21 and 22, which have different thicknesses, with a spin speed of 800 rpm for 3 min. A hexagonally close packing of sphere 30 is assembled in a monolayer as shown in FIGS. 2a and 2b. There are many methods for forming close-packed monolayer spherical particles on a substrate, they can be found in patents and other sources such as Deckman and Dunsmuir, U.S. Pat. No. 4,407, 695), Nagayama; Kuniaki et al, U.S. Pat. Nos. 5,437,892 and 5,505,996 the contents of which are incorporated herein by reference.

Figure 3:
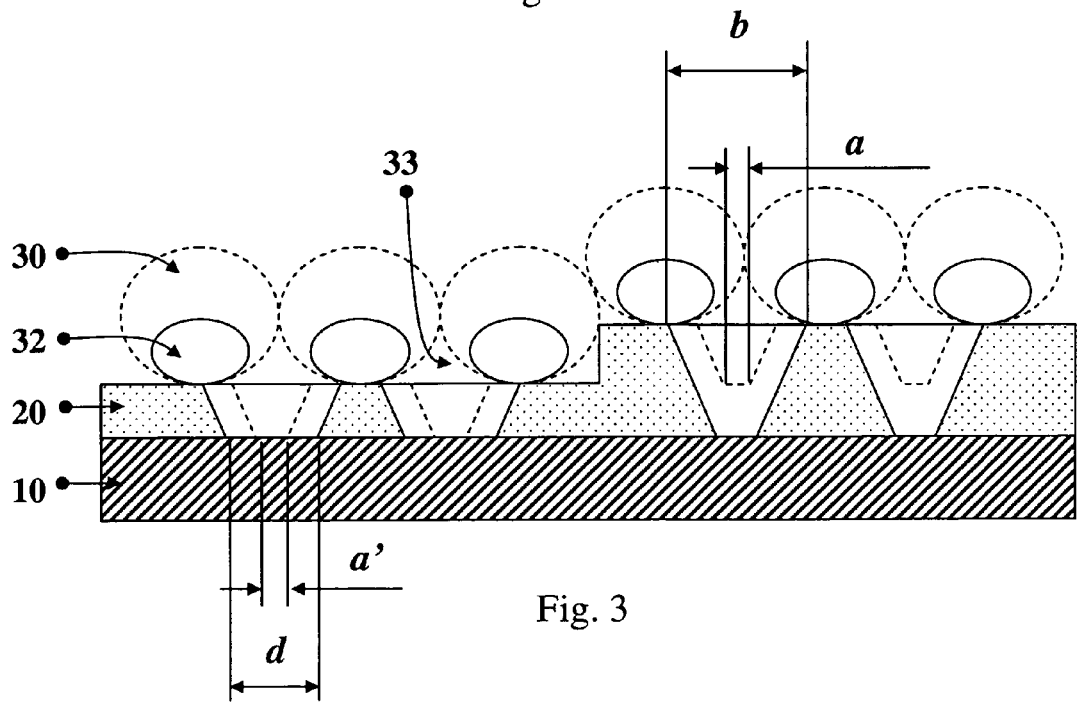
FIG. 3 is a cross-sectional schematic drawing showing structures formed after dry etching of the sample shown in FIG. 2.
Figure 5:
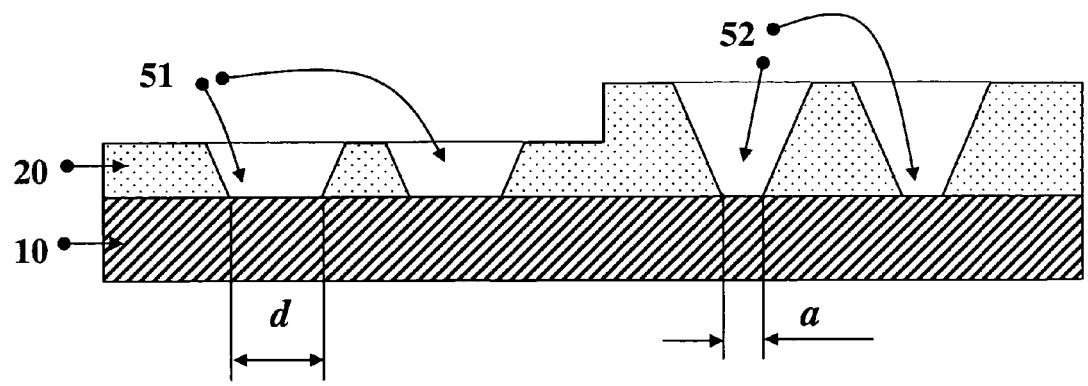
FIG. 5 is a cross-sectional schematic drawing showing the nano-structure arrays with different feature sizes after removing the latex spheres.

Referring to FIG. 3, the sample is then loaded into an ICP chamber for dry etching to open nano-windows (51 and 52 as shown in FIG. 5) in the intermediate layer $SiO_2$ 20 through the spaces 33 of the close-packed sphere assembly 30, which serves as a etching mask. $CF_4$ with flow rate of 20 sccm, $O_2$ with flow rate of 5 sccm, Ar with flow rate of 20 sccm, are used as etchants in this process. Chamber pressure is kept at 5 Torr, RF power set at 500 W and ICP power of 200 W. Etching time is set as 5 min.

Dry etching for the $SiO_2$ 20 occurs through the spaces 33 between the spheres 30. At the beginning of the etching, only the triangle shaped portions 33 (viewing from top of the sample as shown in FIG. 2) where the base length of the triangles is defined as a (as shown in FIG. 3) can be etched due to the existence of the spheres 30. However, the spheres 30 are also etched at these etching conditions. That means the diameter of the spheres 30 is gradually reduced to that of the small one 32 during the etching process. So the etched cross section profile of the SiO$_2$ has sloping sides as shown in FIG. 3 and the bottom of the etched pit a (equal to the base length of the triangles 33 viewed from top) maintains the same width until it reaches the GaAs substrate. But the surface portion b (as shown in FIG. 3) is enlarged by etching due to the reduction of diameter of the spheres 30. When the base a' (as seen in FIG. 3 at the thinner SiO$_2$ area 21) reaches the GaAs substrate, the base a (at the thicker SiO$_2$ area 22) is still within the intermediate layer. The bottom of the etched pit a' is enlarged further if the dry etching is carried out further, and the a' will enlarged to d at the thinner SiO$_2$ area 21 by the time a reaches the substrate 10 at the thicker SiO$_2$ area 22. Then two kinds of window arrays 51 and 52 (see FIG. 5) with different bottom sizes, d of the triangular shape at the thinner SiO$_2$ area 21 and a of the triangular shape at the thicker SiO$_2$ area 22, are formed. Bottom size of both kinds of the opened windows 51 and 52 at areas 21 and areas 22 can be further enlarged by continuing the dry etching process.

Figure 7:
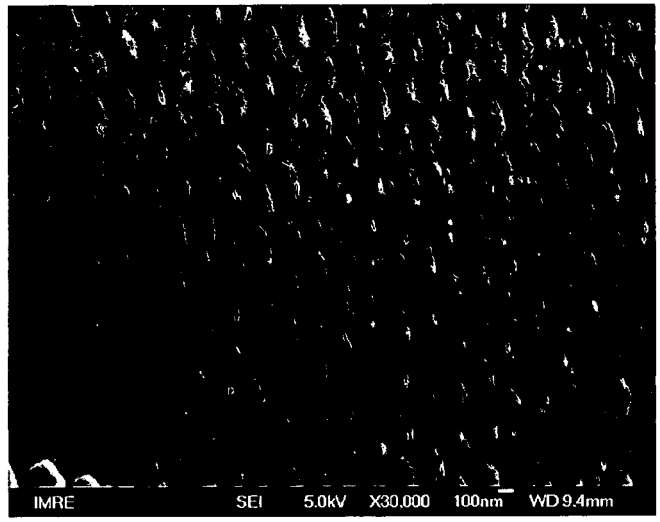
FIG. 7 is an experimental result showing the SEM image of $SiO_2$ patterns formed by dry etching through a monolayer of sphere assembled as etching mask.

FIG. 7 shows an experimental result of the nanopatterns (the nano-windows have not been opened) fabricated through the monolayered sphere assembly of the PS latex spheres on the surface of SiO$_2$.

Figure 4B:
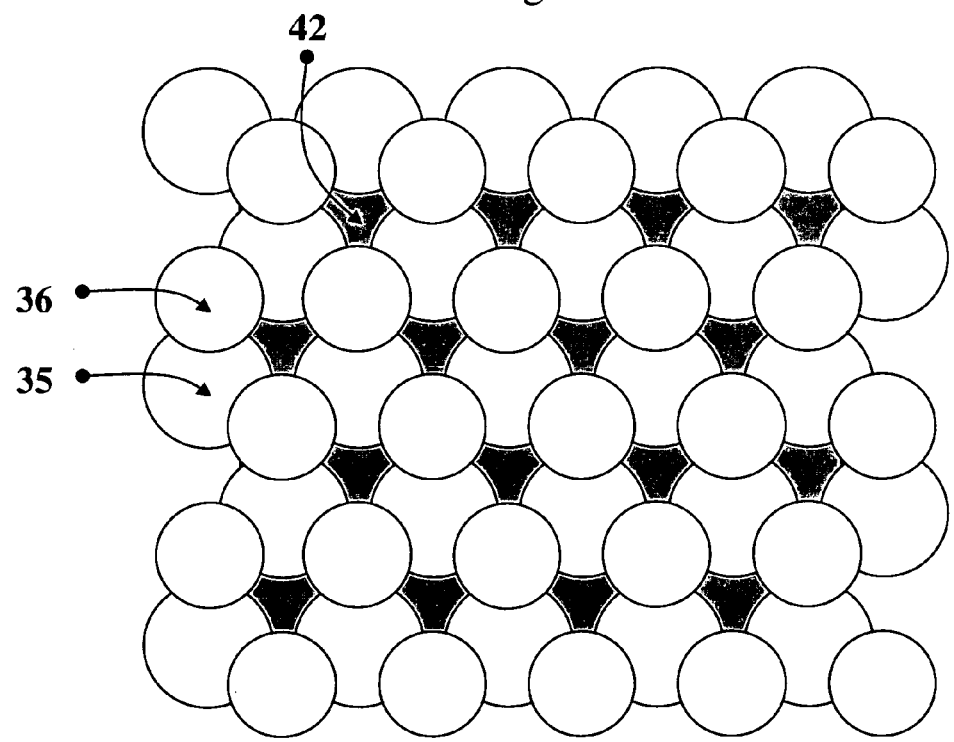
Figure 8:
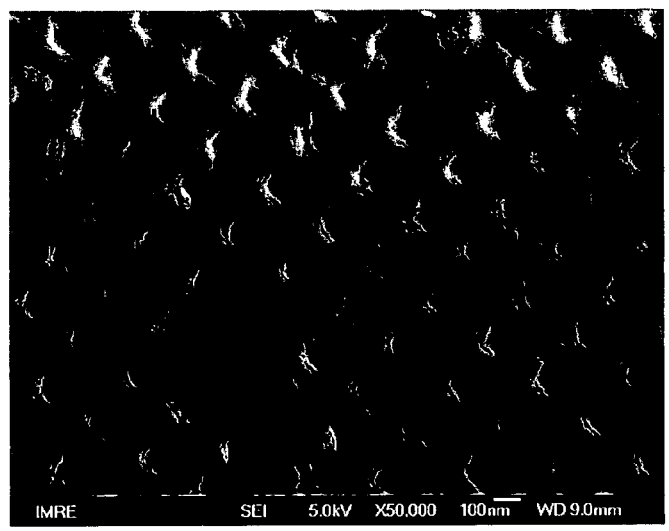
FIG. 8 is an experimental result showing the SEM image of $SiO_2$ patterns formed by dry etching through a bilayer sphere assembled as etching mask.

Similarly, a bilayer close-packed assembly of the spheres can also be used as an etching mask to fabricate multi-sized pattern arrays. However, the period and features of the window arrays (region between the spheres) are different to that formed through monolayered spheres as shown in FIG. 4. FIG. 4a displays a top view of schematic drawing showing the sample before the dry etching process with a bilayer assembly of the latex spheres on the surface of the intermediate layer. FIG. 4b displays a top view of schematic drawing showing the structures after dry etching of the sample shown in FIG. 4a;

FIG. 8 shows an experimental result of the nanopatterns (the nano-windows have not been opened) fabricated through the bilayer assembly of the PS latex spheres on the surface of SiO$_2$.

It follows that, patterned arrays with multi-sizes can be obtained according to this invention by using an intermediate layer with areas having different thicknesses.

Referring to FIG. 5, after the dry etching, the PS spheres are then removed by toluene treated in with ultrasonic for 5 min to form a nanopattern array 51 with a larger feature size (bottom portion of the nano-windows) located at the thinner area 21 and 52 with a smaller feature size located at the thicker area 22, though the top portion of the nano-window is almost the same.

Figure 6:
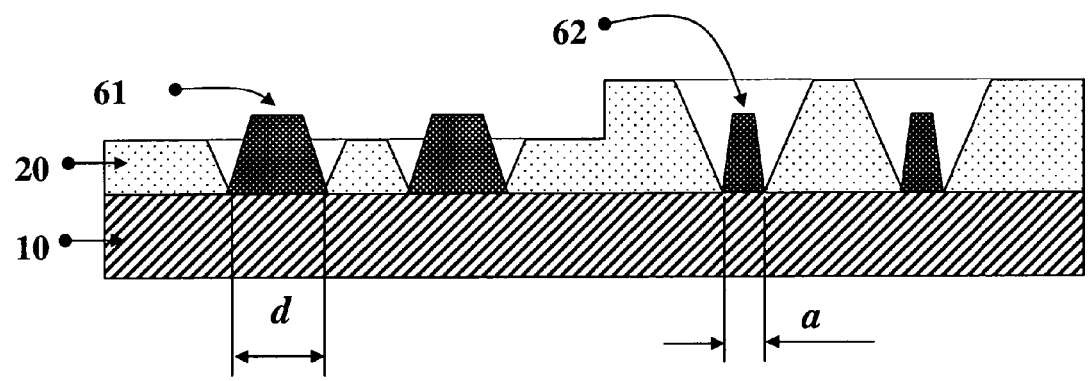
FIG. 6 is a cross-sectional view of schematic drawing showing nano-structure arrays with different feature sizes deposited selectively through the patterns formed by this method.

Referring to FIG. 6, an In$_{0.25}$Ga$_{0.75}$As layer sandwiched between GaAs layers is then grown on the GaAs substrate by selective MOCVD at 600° C. through the SiO$_2$ patterned arrays. Two kinds of nano-sized bar-like structures 61 and 62 are formed due to the different sizes of the SiO$_2$ windows.

Figure 9A:
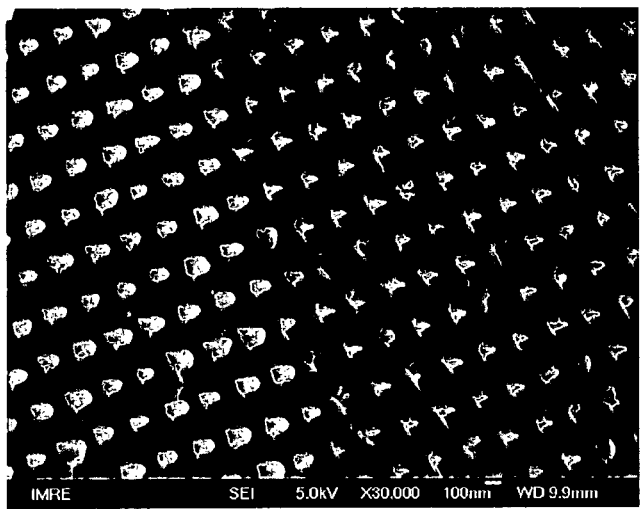
FIGS. 9a and 9b are experimental results showing the selective growth of $In_{0.25}Ga_{0.75}As$/GaAs quantum bars with different feature size through the $SiO_2$ pattern arrays formed according to the present invention.
Figure 9B:
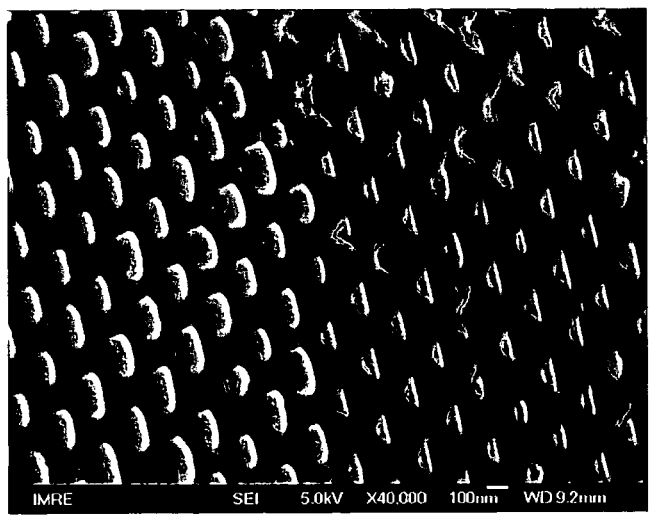

FIGS. 9a and 9b are experimental results showing the selective growth of In$_{0.25}$Ga$_{0.75}$As/GaAs nano bars with different feature sizes growing through the SiO$_2$ pattern arrays formed by this invention. The average dimension of the larger nano bars with multi-facets are, ~150 nm long, ~100 nm wide and λ80 nm high, while the small ones are ~100 nm long, ~30 nm wide and ~30 nm high.

What is claimed:

1. A method of fabricating a two dimensional nano-structure array of features comprising:
   providing a substrate;
   providing an intermediate layer on said substrate, said intermediate layer having at least two selectively located regions of different uniform thickness;
   then placing at least one layer of particles over said intermediate layer, said particles placed in a close-packed arrangement forming an array of voids between said particles;
   etching the intermediate layer through said voids, and so forming the array of features in said intermediate layer corresponding to the voids; and
   forming sloping sides on said features as a result of the particles being gradually etched.

2. The method according to claim 1, further including the step of progressively etching the intermediate layer until said array of features extends from an upper surface of the intermediate layer to the substrate, such that the at least two regions of different thickness being of different size.

3. The method according to claim 2, wherein the different size includes differences in any one or a combination of the dimensions of depth, breadth, width and diameter of the features.

4. The method according to claim 1, further including the step of removing the layer of particles after the etching step.

5. The method according to claim 1, wherein the particles are spherical.

6. The method according to claim 5, wherein the close-packed arrangement is a close-packed hexagonal arrangement.

7. The method according to claim 1, further including the step of placing a further layer of close-packed particles before the etching step.

8. The method according to claim 7, wherein a combination of the two layers of particles form hexagonal voids.

9. The method according to claim 1, wherein the particles are of uniform size and shape.

10. The method according to claim 1, wherein the particles vary in size and/or shape.

11. The method according to claim 1, wherein the intermediate layer includes different materials or layers.

12. The method according to claim 5, wherein the region having the greatest thickness has a thickness less than half the diameter of said spherical particles if a dry etching rate of said particles is greater than the dry etching rate of the intermediate layer.

* * * * *